United States Patent [19]
Humphrey et al.

[11] Patent Number: 5,797,791
[45] Date of Patent: Aug. 25, 1998

[54] VENTED WINDOW ASSEMBLY

[75] Inventors: James T. Humphrey, Roanoke; Randy L. Pratt, Salem, both of Va.

[73] Assignee: Mountain Car Company, Salem, Va.

[21] Appl. No.: 685,503

[22] Filed: Jul. 24, 1996

[51] Int. Cl.[6] ........................ B60H 1/26
[52] U.S. Cl. ............... 454/134; 454/94; 454/145; 454/212
[58] Field of Search ................ 454/76, 84, 94, 454/95, 134, 145, 212

[56] References Cited

U.S. PATENT DOCUMENTS

| | | | |
|---|---|---|---|
| 1,433,166 | 10/1922 | Wolff | 454/212 X |
| 2,248,329 | 7/1941 | Bell, Jr. | 454/145 |
| 2,372,164 | 3/1945 | Woodhams | 454/94 |
| 2,460,604 | 2/1949 | Simcox | 454/76 X |
| 3,375,772 | 4/1968 | Kelly et al. | |
| 3,760,707 | 9/1973 | Kelly | |
| 3,839,950 | 10/1974 | Kelly et al. | |
| 4,452,129 | 6/1984 | Kelley et al. | |
| 5,020,425 | 6/1991 | Kelly | |
| 5,137,327 | 8/1992 | Edmonds et al. | |

FOREIGN PATENT DOCUMENTS 24 59 899  7/1975  Germany .................. 454/145

*Primary Examiner*—Harold Joyce
*Attorney, Agent, or Firm*—Dority & Manning

[57] ABSTRACT

A vented window assembly is provided for any manner of vehicle or vessel. The window assembly has a unitary piece of glass with an opening defined therein. A vent assembly is mounted in the opening and is sealingly engaged with the glass. The vent assembly includes an operable vent which is selectively positioned between an opened position and a closed position. The vent is rotatable relative to the glass so that the vent can act as a forced air or exhaust vent.

15 Claims, 8 Drawing Sheets

VENTED WINDOW ASSEMBLY

BACKGROUND OF THE INVENTION

The present invention relates to a vented window assembly, and in particular to a window assembly intended for compartment spaces of vehicles, such as truck cabs, recreational vehicles, marine vessels, and the like.

Window assemblies are well known in the art for various applications on commercial vehicles, recreational vehicles, and marine vessels. For example, a conventional window assembly is manufactured by Hehr Company of Los Angeles, California, for commercial truck cabs. This window assembly is typically located in a side panel of the sleeper compartment of commercial trucks. The window assembly of this prior art device has a frame structure with at least two, and typically three, pieces or panes of unitary glass housed or carried by the frame structure. At least one of the pieces of glass is movable relative to the frame structure to provide a vent path through the window assembly. For example, with this conventional window assembly, one of the bottom panes of glass can be pushed out of the frame wherein a screen can then be slid across the opening.

The prior art devices, particularly devices like the one manufactured by Hehr Company, has significant drawbacks, particularly in applications for moving vehicles or vessels wherein the units experience continuous and substantial vibrations. With conventional units wherein separate pieces of glass are housed in a common frame structure, it is relatively difficult to establish and maintain the integrity of the sealing devices for the glass against the frame edges. The problem becomes more pronounced as the vehicle and frame structure of the window distort over time due to everyday wear and tear and environmental influences.

Additionally, the prior art devices are relatively expensive in that the separate pieces or panes of glass require a relatively great amount of frame structure and seals between the adjacent edges of the glass panes. This is particularly true when one of the glass panes must be slid relative to the other. In this case, a track system must also be utilized. Thus, what is needed in the art is an improved vented window assembly wherein all of the benefits of a window are utilized without the disadvantages of conventional vents associated with known devices. Such an improvement will provide benefits in the trucking industry, as well as in recreational vehicles, marine vessels, and any other manner of vehicle or vessel wherein vented window assemblies are used.

OBJECTS AND SUMMARY OF THE INVENTION

It is therefore a principal object of the present invention to provide an improved vented window assembly for any manner of vehicle or vessel.

It is a further object of the present invention to provide a vented window assembly wherein a variably positionable vent is disposed completely in a single pane of glass of a window assembly.

It is yet another object of the present invention to provide an improved vented window assembly which substantially eliminates leaking, both water and air, problems with known conventional assemblies.

Still another object of the present invention is to provide a vented window assembly wherein the vent assembly is variably positionable so that the vent can act as a forced air vent or an exhaust vent.

Yet another object of the present invention is to provide a vented window assembly for commercial truck cabs which can be retrofitted to replace conventional window assemblies.

Additional objects and advantages of the invention will be set forth in the following description, or may be obvious from the description, or may be realized through practice of the invention.

In accordance with the objects and purposes of the invention, the present invention provides a vented window assembly for ventilation of a compartment of any manner of vehicle or vessel, such as commercial truck sleeper compartments, marine vessels, and the like. The vented window assembly has a unitary piece or pane of glass material which is configured for mounting in a panel structure of the vehicle or vessel. An opening is defined or cut through the unitary piece of glass. In a preferred embodiment, the opening is continuously radiused or circular. However, the opening may also be oval shaped, multi-sided, or the like.

A vent assembly is mounted in the opening and includes a frame structure which is sealingly engaged with the glass material. The vent assembly includes an operable vent which is selectively positionable between an open position wherein an air flow path is defined through the window assembly into the vehicle compartment, and a closed position wherein the air flow path is sealed. The window assembly does not have separate or distinct pieces of glass housed in a common structure wherein the vent path is established by moving one of the panes of glass relative to the others or the frame structure. However, it should also be understood that the present invention can be incorporated with a larger window assembly wherein additional panes of glass are utilized.

In a preferred embodiment of the invention, the vent assembly includes a frame structure which is attached within the opening. The frame structure is sealed relative to the glass material with any manner of conventional sealing means. The vent assembly includes an operable vent which is preferably rotatably mounted in the frame structure so as to be rotatable relative to the glass material and frame structure. The operable vent can thereby be positioned to act as a forced air vent wherein the open vent faces in the direction of movement of the vehicle, or an exhaust vent wherein the open vent faces in the opposite direction.

The vent assembly includes a vent plate which is carried by the frame structure. The vent plate includes a plurality of openings defined therethrough which can be arranged in any desired pattern or manner. The vent plate includes a sealing surface on the outward facing side. The vent assembly includes a vent cover which, in a closed position on the vent, sealingly contacts the sealing surface, and in an open position of the vent is pushed away from the sealing surface. The vent cover is adjustable between a fully open and fully closed position. An operating mechanism is included to open and close the vent by moving or pivoting the vent cover relative to the vent plate. The operating mechanism includes at least one member connected to the vent cover which extends through the vent plate into the vehicle compartment. This member preferably includes a hand device or mechanism which allows an operator to move the vent cover away from or towards the vent plate. A tensioning device is provided in the vent assembly to apply a clamping force to the vent cover to maintain the vent cover sealingly engaged against the vent plate.

It should be appreciated that the vent assembly need not have the same configuration as the opening defined in the unitary piece of glass. For example, the opening may comprise a substantially circular opening, yet the vent assembly may comprise a square or rectangular vent fitted in the circular opening. On the other hand, the opening may be rectangular or multi-sided and the vent assembly may be substantially round. The only requirement is that the frame structure of the vent assembly sealingly engage with the glass material.

In a preferred embodiment of the invention, the opening is substantially round or circular and the vent assembly is correspondingly shaped. In this embodiment, the vent plate and vent cover are thus substantially circular. The vent cover pivots along a pivot line relative to the vent plate. The vent plate and cover are also rotatable relative to the frame structure so that the vent can be rotated up to 360°. In this manner, in the open position of the vent assembly, the open portion or side of the assembly can be rotated to any desired position and acts as a forced air vent or exhaust vent.

In a preferred embodiment of the circular vent assembly, the arm members connected to the vent cover comprise circumferentially extending braces or members which extend through circumferential slots defined in the vent plate. The arm plates roll against rollers attached to the vent plate. The rollers have a compressible surface and are spaced so as to apply a clamping force to the vent cover through the arm braces. The rollers can move into and out of recesses defined along the edge of the arm plates. The recesses define variable positions of the vent cover relative to the vent plate. A handle connects the members so that an operator can grasp the handle and simply push the vent cover away from the vent plate or pull the vent cover towards the vent plate.

In an alternative embodiment of the tensioning device, a tensioning bar or rod is attached to the vent plate and extends through slightly radiused slots defined in the arm members or braces. The arm members roll against rollers provided on the tension bar. The tensioning bar is positioned and has enough flex so as to provide a clamping force to the vent cover through the arm members or braces.

The present invention provides distinct advantages over the state of the art in that the advantages of a vented window assembly are realized without the problems noted with conventional devices. With the present device, the necessity for expensive framing structure and track devices for sliding or pivoting panes of glass is eliminated. The unique vent assembly of this invention defined in a unitary piece of glass includes an operable vent which reliably seals, as well as provides the beneficial option of being rotatable or variably positionable relative to the glass. The vent can thus act as a forced air vent or an exhaust vent, depending on the needs of the operator. It should also be appreciated that the present window assembly has utility in any number of applications, including recreational vehicles, commercial trucks, passenger vehicles, marine vessels, and the like.

The accompanying drawings further exemplify the invention, as set forth in greater detail below.

DETAILED DESCRIPTION OF THE PREFERRED EMBODIMENTS

Figure 1:
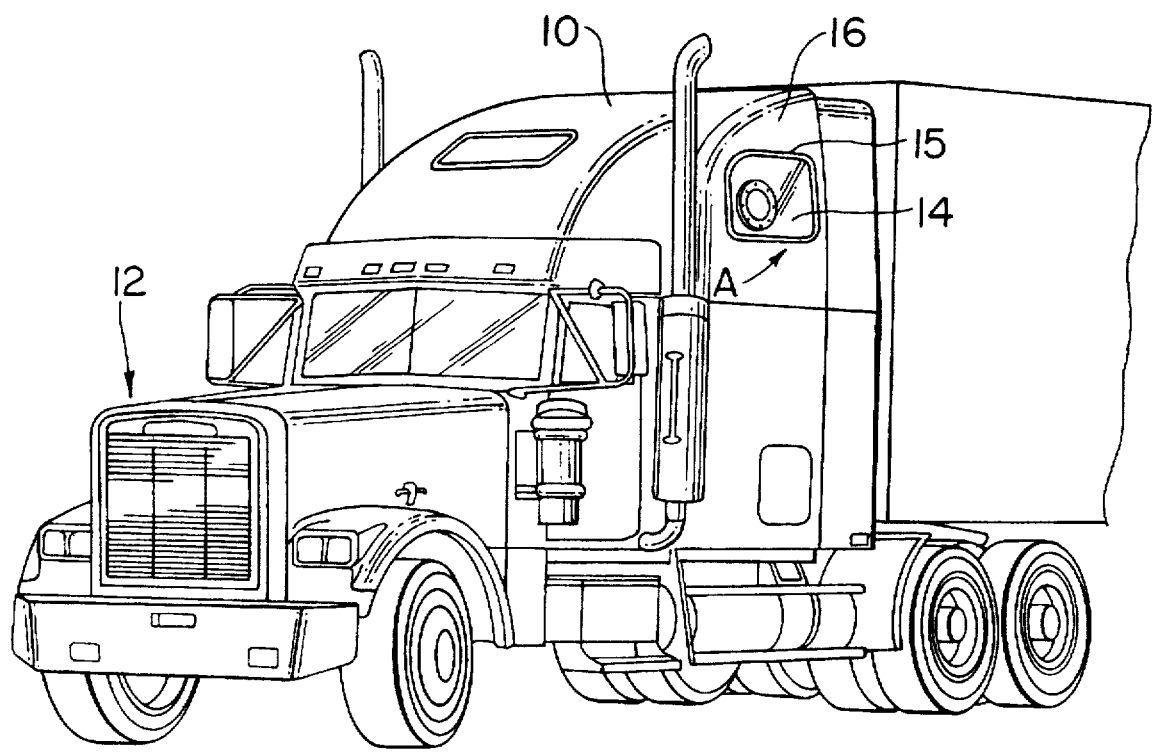
FIG. 1 is an environmental view of the vented window assembly utilized on a sleeper compartment of a commercial truck.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For example, features illustrated or described as part of one embodiment, can be used on another embodiment to yield a still further embodiment. Thus, it is intended that the present invention cover such modifications and variations as come within the scope of the appended claims and their equivalents. Additionally, the numbering of components in the drawings is consistent throughout the application, with the same components having the same number in each of the drawings.

In accordance with the present invention, a vented window assembly is provided for utilization in any type of vehicle. For example, FIG. 1 illustrates one such use of a vented window assembly A configured in a sleeper compartment 10 of a commercial truck 12. The window assembly A is configured in a side panel 16 of the sleeper compartment. FIG. 1 illustrates but a mere example of one preferred use of the vented window assembly. Window assembly A could just as well as be used in any manner of recreational vehicle, such as a camper or utility vehicle, as well as any manner of marine vessel. Generally, window assembly A has utility in any application wherein it is desired to have a vented window. Accordingly, although the window assembly is illustrated in FIG. 1 utilized in a commercial truck, it should be understood that this is for illustrative purposes only.

Figure 2:
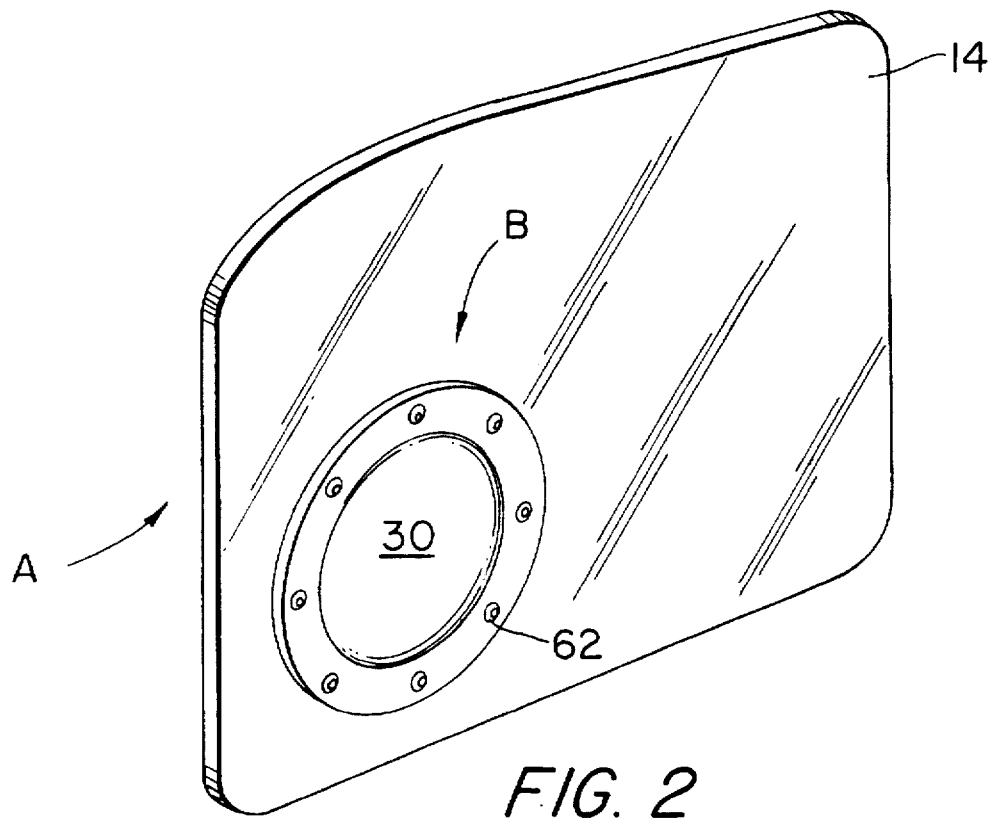
FIG. 2 is a perspective view of the vented window assembly illustrated in FIG. 1.
Figure 3:
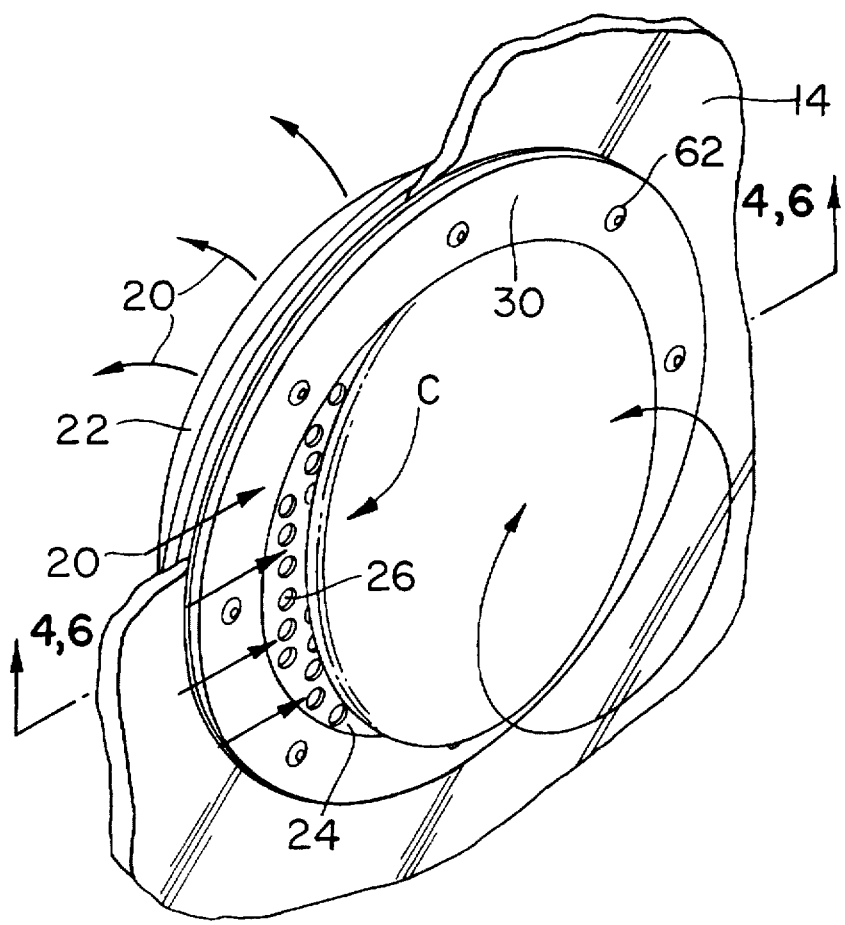
FIG. 3 is a partial perspective and cut away view of the vent assembly of the vented window illustrated in FIGS. 1 and 2.

Referring generally to FIGS. 1 through 3, window assembly A comprises a unitary piece of transparent or translucent material, such as glass 14. It should be understood that for purposes of describing the invention, material 14 will be referred to as "glass." However, any transparent or translucent material suitable for use in a window application, such as a plastic or thermoplastic polymer, may be utilized.

The glass material 14 is "unitary" in that it is a single piece of glass and does not constitute individual pieces of glass which are movable or slidable relative to each other in a frame structure. As illustrated in FIG. 1, glass material 14 is mounted in a side panel 16 of a compartment 10 by any suitable frame structure 15, or like device. Structures and devices for mounting and sealing window units in such compartments are well known in the art and a detailed explanation thereof is not necessary.

Referring particularly to FIG. 3, vented window assembly A includes a vent assembly, generally B. Vent assembly B has an operable vent, generally C. When vent C is opened, an air flow path 20 is generated through the vent into or out of a compartment, as generally shown in FIG. 3. As explained in further detail below, in a preferred embodiment of the invention, vent C is rotatable, as generally illustrated by the arrows in FIG. 3, so that the vent can act as both a forced air vent wherein air is forced into the compartment 10 by motion of the vehicle, or the vent can be rotated in the window so that an exhaust air flow path is established from inside the compartment to outside of the vehicle.

Figure 7:
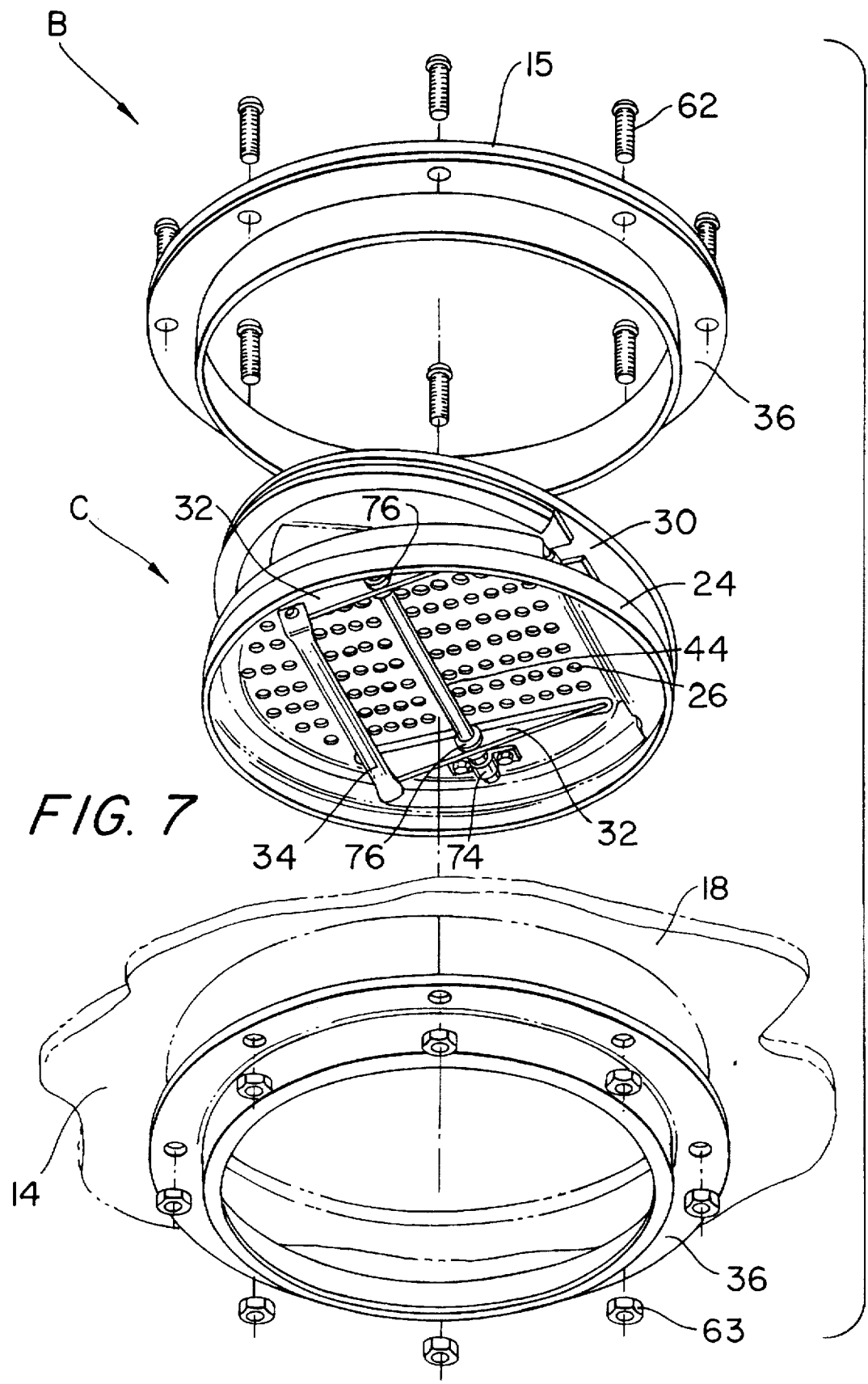
FIG. 7 is an in-line component view of an embodiment of the vent assembly according to the invention.
Figure 8:
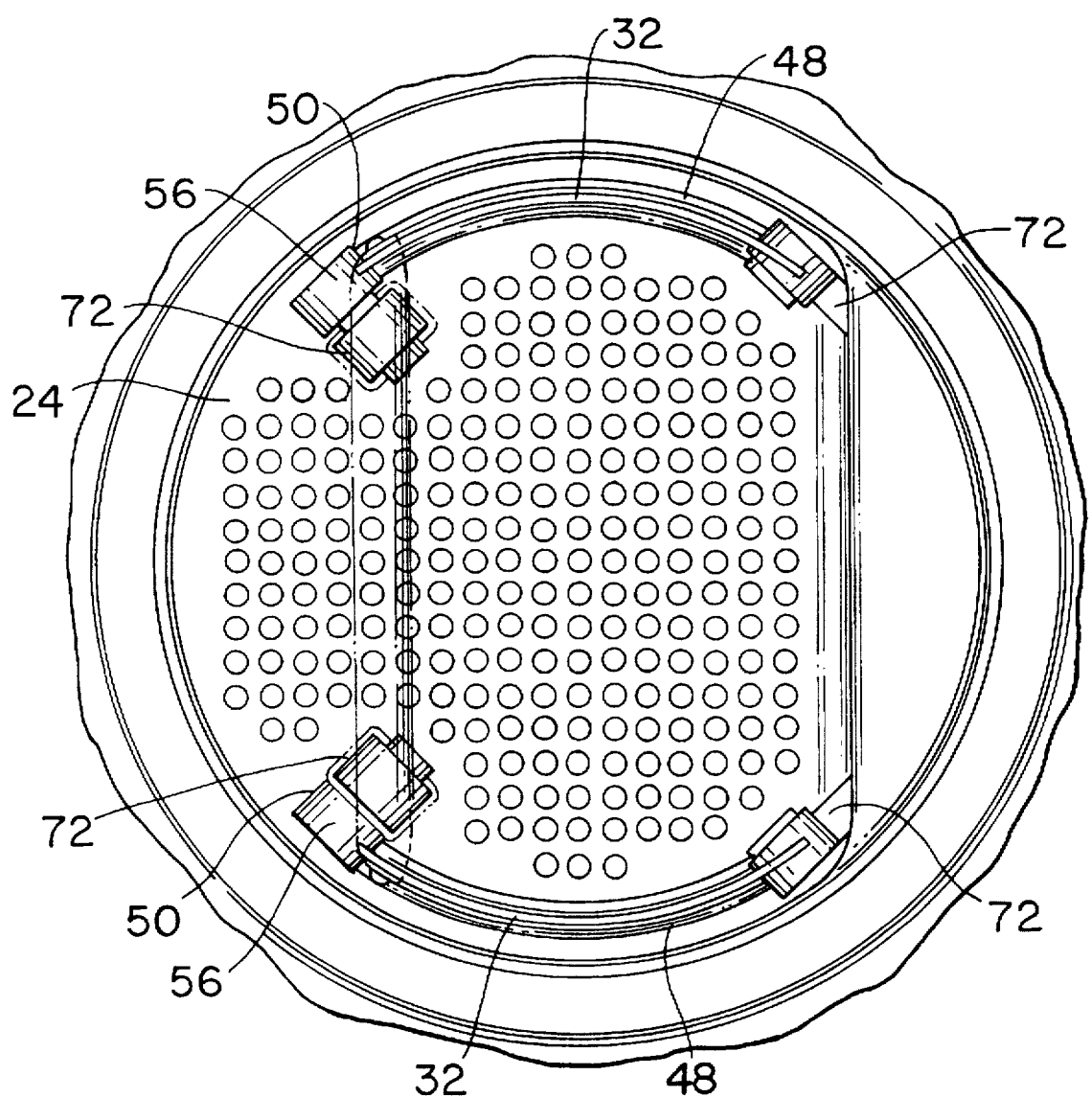
FIG. 8 is a view of the vent assembly of FIG. 6 taken along the lines indicated.
Figure 10:
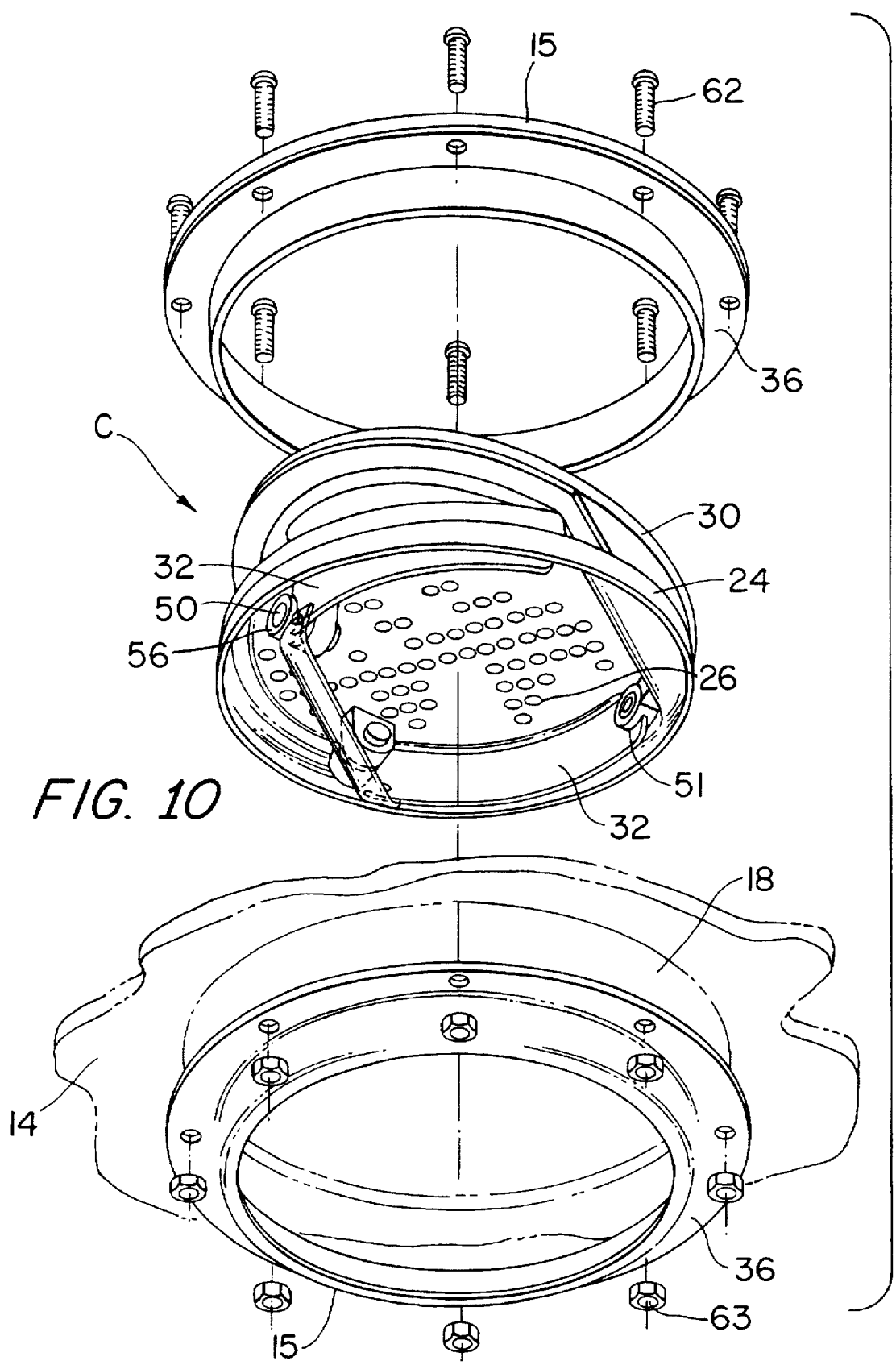
FIG. 10 is an in-line component view of the vent assembly of FIG. 6.

Referring to the figures in general, and particularly FIGS. 7 and 10, the vented window assembly includes an opening 18 defined through the unitary piece of glass material. Opening 18 may be "continuously radiused" in that it essentially contains no straight edges in embodiments wherein it is particularly difficult to cut straight edges in the glass material 14. The opening is preferably circular, as shown in the figures, but could also be oval or otherwise, including square or rectangular. In attempting to overcome the problems noted with conventional window assemblies discussed in the background section of this application, the present applicants determined that the best way to correct the noted deficiencies is to dispose a vent directly in a unitary piece of glass so that the possibility of leaking or deteriorating seals or structure between adjacent pieces of movable glass is virtually eliminated. However, it is extremely difficult, if not impossible in commercial applications, to cut an opening with straight sides or edges of sufficient size in commercial grade window glass. Radiused cuts, particularly circular cuts, are more readily achieved and result in fewer pieces of cracked or wasted glass. Accordingly, the opening 18 in glass 14 has a continuous radiused circumference, and is preferably circular. Opening 18 is cut in glass 14 by conventional means.

However, in embodiments wherein glass material 14 comprises a plastic or polymer material, such as Plexiglass®, straight edges may be easily cut, and opening 18 may have any shape.

Vent assembly B is mounted in opening 18 and is sealingly engaged with glass 14. In the embodiment illustrated in the figures, vent assembly B includes a frame structure 22 which is mounted to the glass 14. Frame structure 22 may include opposite edge pieces 36, 37, as particularly illustrated in FIGS. 4 through 6 and 9. Edge pieces 36, 37 are attached to glass material 14 by conventional means, such as bolts 62 and nuts 63. A gasket or other suitable material 64 is provided between the outside edge piece 37 and window 14. Any conventional means of mounting the frame structure to glass material 14 can be utilized. For example, double-sided tape, epoxies, and any suitable adhesives may be used to sealingly mount frame 22 to glass material 14. The illustrated embodiment utilizing bolts 62 and nuts 63 is but one preferred embodiment.

In the embodiment of frame structure 22 illustrated, the opposite edge pieces 36, 37 are formed as generally L-shaped nesting members. Outside edge piece 37 and inside edge piece 36 sandwich glass 14 therebetween. Inside edge piece 36 forms a lip 70 which faces the compartment 10. The portion of outside member 37 extending through opening 18 is generally straight with a radially inward extending section 71. The purpose of section 71 will be explained in detail below.

The frame structure members, can be formed of any suitable material, such as a plastic material, metal, or any other material suitable for the environment in which the window assembly is to be used.

Figure 4:
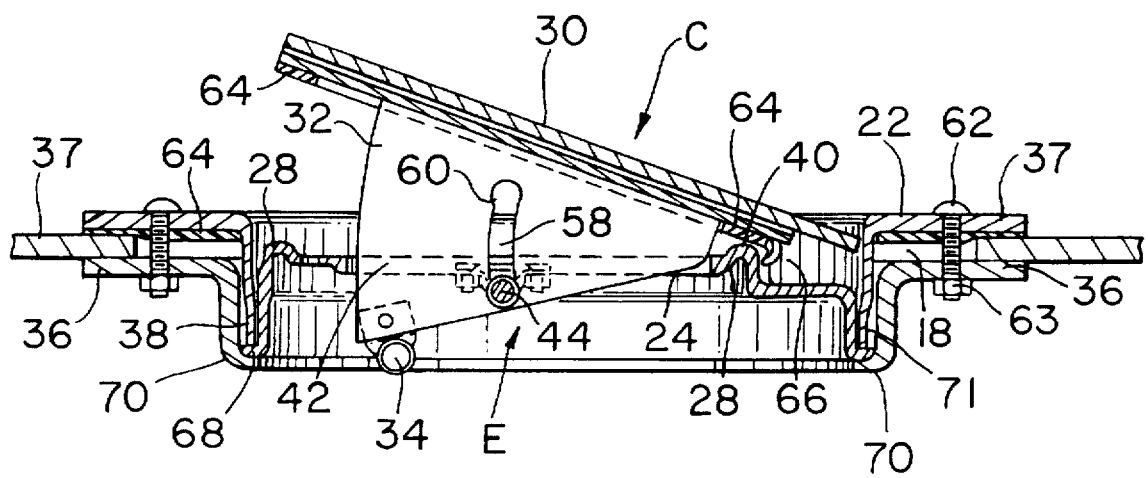
FIG. 4 is a cross-cut view of the vent assembly taken along the lines indicated in FIG. 3 showing the vent in the open position.
Figure 5:
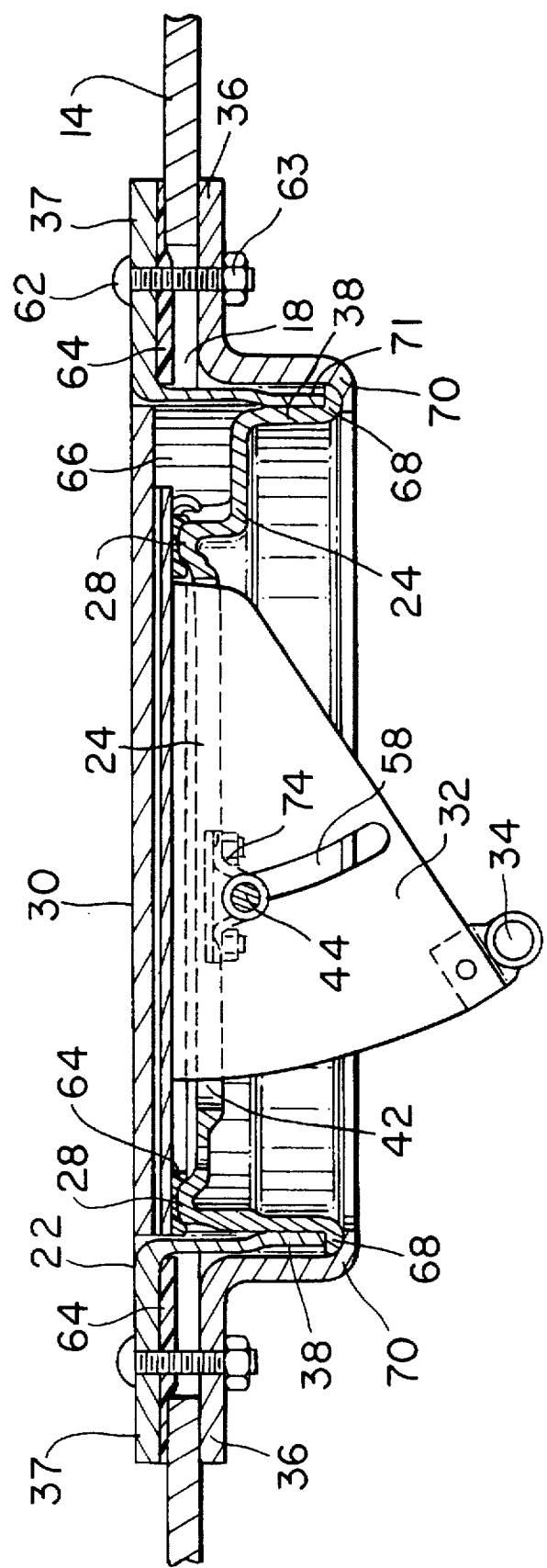
FIG. 5 is a cross-cut view of the vent assembly of FIG. 4 illustrated in the closed position.
Figure 6:
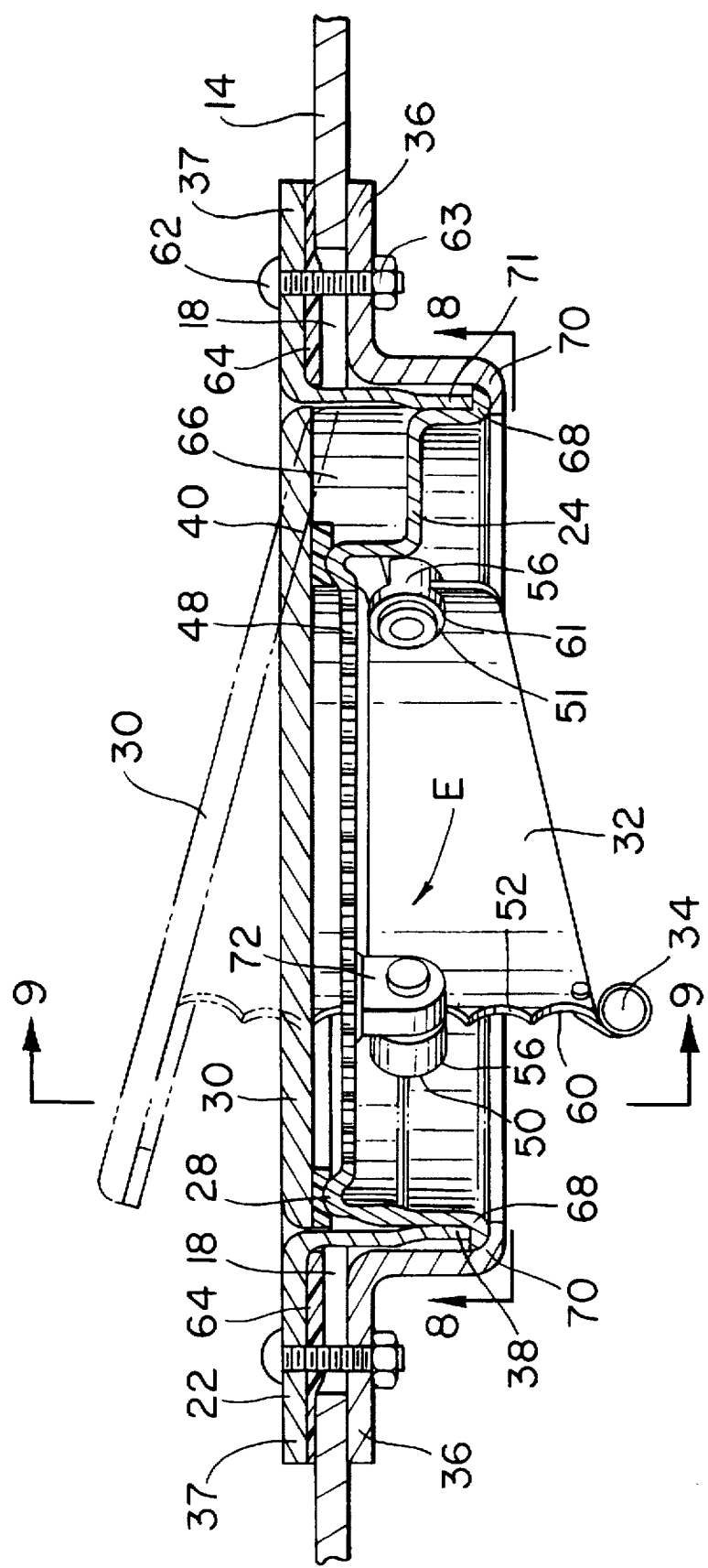
FIG. 6 is a cross-cut view of an alternative embodiment of the vent assembly taken along the lines indicated in FIG. 3 and illustrating the vent in an open and closed position.
Figure 9:
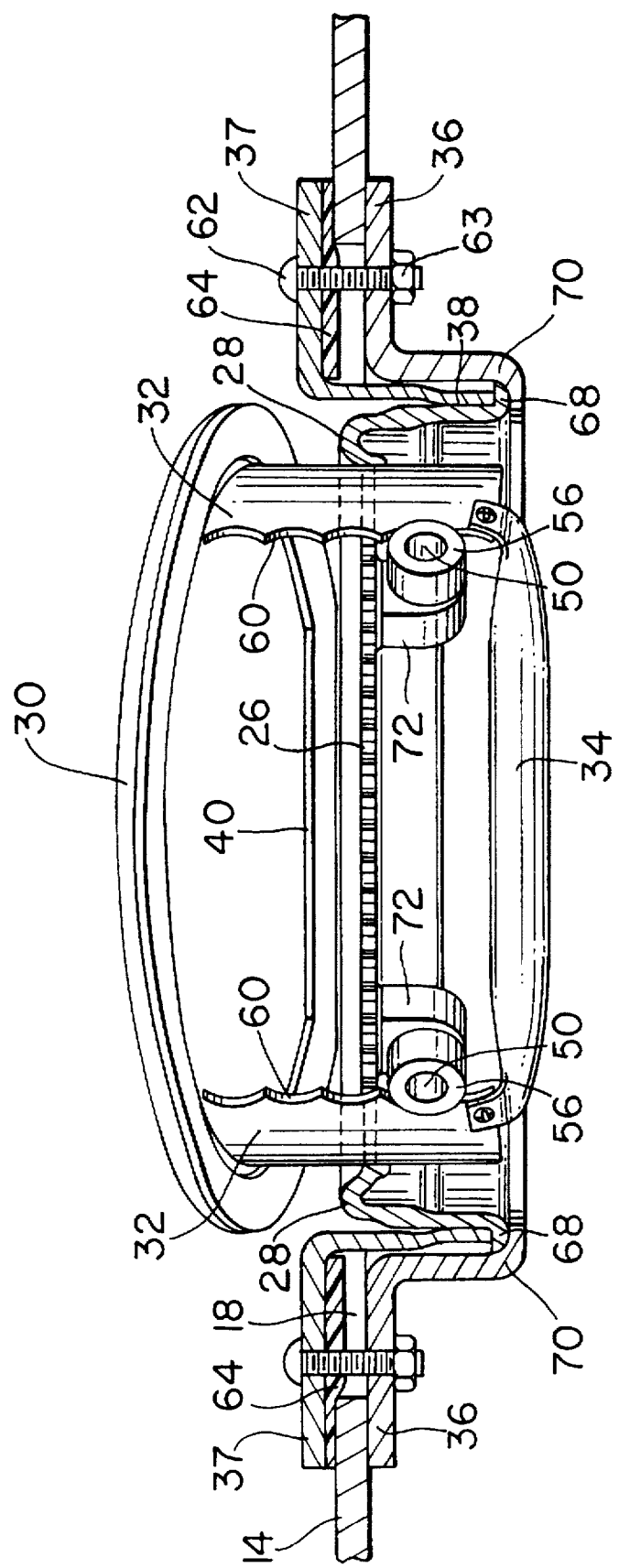
FIG. 9 is a cut-away view of the vent assembly of FIG. 6 taken along the lines indicated.

Vent assembly B includes an operable vent C. Vent C is adjustable and selectively positionable between an opened position, such as illustrated in FIGS. 4, 6, and 9, and a closed position, such as illustrated in FIGS. 5 and 6. In the embodiment illustrated, vent assembly B with operable vent C is illustrated as an essentially circular vent disposed in an essentially circular opening 18. However, it should be understood that vent structure 22 and vent C can have any desired shape and still be disposed in a circular or continuously radiused opening 18, or square or other multi-sided opening 18. For example, a rectangular vent could be disposed in opening 18 so long as frame structure 22 was configured accordingly. Any and all such shapes and configurations of the vent assembly B are within the scope and spirit of the invention.

In the vent assembly particularly illustrated in the figures, a vent cover 30 is pivotally moved relative to a stationary vent plate 24, as particularly seen in FIGS. 4, 5, and 6. Vent cover 30 in its closed position is sealingly engaged against sealing surface or ridge 28 defined on vent plate 24. Vent cover 30 can be formed from any suitable material, including a transparent or translucent material. Additionally, vent covery 30 is preferably paintable or can include a decorative cover or plate. A gasket 64 is disposed on the underside of vent plate 30 to seal against sealing ridge or surface 28. A tensioning device, generally E, is provided to maintain vent cover 30 sealed against vent plate 24 and sealing surface or ridge 28 when the vent is in its closed position, as will be explained in greater detail below.

In the embodiment wherein a circular vent is utilized, vent cover 30 pivots away from vent plate 24 along a pivot line 40, as particularly seen in FIGS. 4 and 6. In the device illustrated, a hinge is not necessary between vent cover 30 and vent plate 24. Vent cover 30 pivots on the sealing ridge 28 defined on vent plate 24, as particularly seen in FIGS. 4 and 6. Thus, gasket material 64 acts as a bearing surface as well as a sealing device. Vent plate 24 defines a circumferential space 66 which allows for vent cover 30 to be pivoted relative to vent plate 24, as particularly seen in FIG. 4. Space 66 is defined along a limited circumferential portion of vent plate 24 so that vent cover 30 can be freely pivoted relative to vent plate 24.

Vent plate 24 includes a plurality of openings 26 defined therethrough. Openings 26 can be arranged or defined in any pattern. Openings 26 allow for the passage of air through vent plate 24.

A tensioning and operating mechanism E is provided with the vent assembly. This device allows for an operator to readily open and close the vent assembly. One preferred embodiment of this mechanism is illustrated in FIGS. 4, 5, and 7. In this embodiment, arm members 32 are attached to the underside of vent cover 30 and extend through slots 42 defined through vent plate 24. A handle 34 is attached between arm members 32. Accordingly, when the vent is in its closed position, as illustrated in FIG. 5, arms 32 with attached handle 34 extend into the compartment of the vehicle. In order to open the vent, an operator simply grasps handle 34 and pushes outward causing vent cover 30 to pivot relative to vent plate 24, as illustrated in FIG. 4.

Any manner or remote or automatic actuating devices may also be configured to open an close the vent assembly, particularly if the vent assembly is positioned in a remote or hard to reach location. Any manner of electro-mechanical remote device can be utilized and are contemplated within the scope and spirit of the present invention.

A tensioning device, generally E, is configured with the vent assembly to maintain a clamping force or tension on vent cover 30, particularly when vent cover 30 is in its closed position. In the embodiment illustrated in FIGS. 4, 5, and 7, tensioning device E comprises a tensioning rod 44 disposed on the inside of vent plate 24. Rod 44 fits through slots 58 defined in arm member 32. Tensioning rod 44 includes rod rollers 76 which interact in slots 58. Rollers 76 preferably comprise a compressible material or covering, such as a rubber or a neoprene material. Rod 44 is mounted to plate 24 by a conventional bracket assembly 74, or any other suitable attaching mechanism. Rod 44 with rod rollers 76 exerts a constant tension on arms 32 through engagement with slots 58. As particularly seen in FIGS. 4 and 5, slots 58 are slightly curved to accommodate the pivoting motion of vent cover 30. Slot 58 includes a recessed end section 60, as particularly seen in FIG. 4, so that rod 44 snaps into section 60 in the closed position of vent cover 30. The clamping or tensioning force applied by rod 44 is more than sufficient to sealingly engage cover 30 against sealing ridge or surface 28 of vent plate 24.

An alternative preferred embodiment of the tensioning and operating mechanism is illustrated in FIGS. 6, 9, and 10. In this embodiment, arm members 32 attached to the underside of vent plate 30 extend through circumferential slots 48 defined in vent plate 24. Arms 32 have an edge 52 defining radiused recesses 60. A single radiused recess 61 is defined on the opposite edge of arm members 32. Roller devices 50 are mounted by any conventional means, such as mounting brackets 72, on the inside surface of vent plate 24. Arm members 32 extend between the pairs of roller devices 50. The roller devices 50 fit into recesses 61, 60 respectively of arm members 32 and include a compressible roller surface 56, such as a neoprene or rubber material. The spacing of rollers 50 and the compressible material exert a continuous clamping force or tension on vent cover 30. To operate this embodiment, the operator merely grasps handle 34 and either pushes or pulls vent cover 30 causing rollers 50 to move into and out of the adjacent recesses 60. Roller 51 remains engaged within recess 61 allowing for vent cover 30 to pivot relative to pivot line 40.

In a preferred embodiment of the invention, particularly illustrated in the figures, the operable vent C is rotatable or variably positionable relative to frame structure 22 up to 360°. In the embodiment illustrated, this rotatable feature is accomplished by having vent plate 24 rotatable within edge members 37 and 36. Referring particularly to FIGS. 4 and 6, vent plate 24 defines a lip 68 which generally nests in lip 70 of inner edge member 36. The radially inward section 71 of outside edge member 37 presses against an adjacent section of vent plate 24. In this manner, a frictional bearing and sealing surface 38 is established between vent plate 24 and edge members 36 and 37. Other configurations or connections between vent plate 24 and edge members 36, 37, such as a labyrinth type seal, can also be utilized. The entire operable vent C is rotated by the operator simply grasping handle 34 and rotating the vent to any desired position. Thus, the vent can be rotated to act as a forced air vent or an exhaust air vent depending on the needs of the operator. Although not illustrated, it may also be desired to include a rolling bearing between vent plate 24 and edge members 37 and 36.

It is within the level of skill of those in the art to design any mechanism or structure for rotating the vent relative to the frame structure and window.

The present vent assembly is readily retrofitted into any existing space or opening of a vehicle compartment. For example, the present assembly can replace the conventional units discussed in the background section of the application.

It should also be understood that vent assembly B, as embodied and described herein, may be installed in any compartment without glass material 14. For example, vents are typically supplied in compartments campers, motor homes, trucks, etc. An example of such conventional vents are the "Hingeless Ventilators" manufactured and sold by Salem Vent International, Inc. of Salem, Va., and described in U.S. Pat. Nos. 3,760,707; 3,839,950; and 4,452,129. The present inventive vent assembly can replace any conventional vent.

It will be apparent to those skilled in the art that various modifications and variations can be made in the apparatus of the present invention without departing from the scope or spirit of the invention. For example, two tensioning devices are illustrated and described in the application but, other tensioning devices may also be utilized. Thus, it is intended that the present invention cover the modifications and variations of this invention provided they come within the scope of the appended claims and their equivalents.

What is claimed is:

1. A vented window assembly for providing ventilation to a compartment of any manner of vehicle or vessel, said window assembly comprising:

at least one unitary piece of transparent or translucent window material, said window material configured for mounting in a panel structure of said vehicle or vessel;

an opening defined through said unitary piece of window material;

a vent assembly mounted in said opening and sealingly engaged with said window material, said vent assembly further comprising an operable vent selectively positionable between an open position wherein an air flow path is defined through said vented window assembly into said compartment, and a closed position wherein said air flow path is sealed; and said vent assembly comprising a frame structure with opposite edge members for mounting onto said window material in sealing engagement therewith, and a vent plate with a plurality of openings therethrough rotatable carried in said frame structure and variably positionable relative thereto, said vent assembly further comprising a vent cover which seals against a sealing surface of said vent plate in said closed posed and an operating mechanism connected to said vent cover and extending through said vent plate for moving said vent cover between said closed position and said open position, said vent assembly further comprising a tensioning device for maintaining said vent cover in sealing engagement with said sealing surface.

2. The vented window assembly as in claim 1, wherein said opening is continuously radiused.

3. The vented window assembly as in claim 1, wherein said opening is uniformly radiused and substantially circular.

4. The vented window assembly as in claim 1, wherein said window material comprises glass.

5. The vented window assembly as in claim 1, wherein said edge members define bearing surfaces for said rotatable vent cover.

6. The vented window assembly as in claim 1, wherein said vent cover pivots relative to said frame structure along a pivot line, said operating mechanism comprising opposite arm members attached to an underside of said vent cover and which extend through slots defined through said vent plate, said tensioning device configured with said arm members to maintain said vent cover sealingly engaged against said vent plate.

7. The vented window assembly as in claim 6, wherein said tensioning device comprises a tensioning rod mounted to said vent plate and extending through slots defined in said arm members, said arm members contacting and movable relative to said tensioning rod which applies a clamping force to said arm members.

8. The vented window assembly as in claim 6, wherein said vent cover is substantially circular, said arm members comprising circumferentially extending arms extending through circumferentially extending slots defined through said vent plate.

9. The vented window assembly as in claim 8, wherein said tensioning device comprises roller devices mounted to said vent plate in rolling contact with edges of said circumferential arms, said roller devices applying a clamping force to said circumferential arms.

10. The vented window assembly as in claim 9, wherein said circumferential arms comprise recesses defined in said edges in rolling contact with said roller devices, said roller devices comprising compressible roller surfaces so as to move into and out of said recesses, said recesses defining variable open positions of said vent cover.

11. The vented window assembly as in claim 1, wherein said assembly comprises a motor vehicle vented window assembly.

12. The vented window assembly as in claim 11, wherein said assembly comprises a truck cab vented window assembly.

13. The vented window assembly as in claim 1, wherein said assembly comprises a marine vessel vented window assembly.

14. A vented window assembly for providing ventilation to a compartment of any manner of vehicle or vessel, said window assembly comprising:

at least one unitary piece of glass, said glass configured for mounting in a panel structure of said vehicle or vessel;

a substantially circular opening defined through said unitary piece of glass; and a vent assembly mounted in said opening and sealingly engaged with said glass, said vent assembly further comprising a frame structure sealingly engaged with said glass, and a vent plate carried by said frame structure, said vent plate having a plurality of openings defined therethrough and a sealing surface defined therearound on one side thereof, said vent assembly further comprising a vent cover which, in said closed position of said operable vent, sealingly contacts with said sealing surface, and in said open position of said operable vent is pivoted away from said sealing surface, said vent assembly further comprising an operating mechanism for opening and closing said operable vent by pivoting said vent cover away from or towards said sealing surface, said operating mechanism having at least one member connected to said vent cover and extending through said vent plate and a handle device connected to said member, said vent assembly further comprising a tensioning device configured to apply a clamping force to said vent cover for maintaining said vent cover sealingly engaged against said sealing surface, wherein said vent plate and vent cover are rotatable relative to said frame structure and wherein said vent cover can be rotated to any desired position whereby said vent assembly can act as a forced air vent or exhaust vent for said vehicle or vessel.

15. A truck cab vented window assembly for providing ventilation to a truck compartment, said window assembly comprising:

at least one unitary piece of window material, said window material configured for mounting in a panel structure of said truck cab;

a continuously radiused opening defined through said window material; and a vent assembly mounted in said opening and sealingly engaged with said window material, said vent assembly further comprising a frame structure sealingly engaged with said glass, and a vent plate carried by said frame structure, said vent plate having a plurality of openings defined therethrough and a sealing surface defined therearound on one side thereof, said vent assembly further comprising a vent cover which, in said closed position of said operable vent, sealingly contacts with said sealing surface, and in said open position of said operable vent is pivoted away from said sealing surface, said vent assembly further comprising an operating mechanism for opening and closing said operable vent by pivoting said vent cover away from or towards said sealing surface, said operating mechanism having at least one member connected to said vent cover and extending through said vent plate and a handle device connected to said member, said vent assembly further comprising a tensioning device configured to apply a clamping force to said vent cover for maintaining said vent cover sealingly engaged against said sealing surface, wherein said vent plate and vent cover are rotatable relative to said frame structure wherein said vent cover can be rotated to any desired position whereby said vent assembly can act as a forced air vent or exhaust vent for said truck cab.

* * * * *